US011711690B2

United States Patent
Kalbasi

(10) Patent No.: US 11,711,690 B2
(45) Date of Patent: Jul. 25, 2023

(54) METHODS AND SYSTEMS FOR FACILITATING VARIABLE AUTHENTICATION OF USERS ON MOBILE DEVICES

(71) Applicant: Capital One Services, LLC, McLean, VA (US)

(72) Inventor: Negar Kalbasi, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 105 days.

(21) Appl. No.: 17/482,289

(22) Filed: Sep. 22, 2021

(65) Prior Publication Data
US 2023/0092487 A1    Mar. 23, 2023

(51) Int. Cl.
*H04W 12/06* (2021.01)
*H04W 4/02* (2018.01)
*H04W 4/029* (2018.01)

(52) U.S. Cl.
CPC ........... *H04W 12/06* (2013.01); *H04W 4/027* (2013.01); *H04W 4/029* (2018.02)

(58) Field of Classification Search
CPC ............................... H04W 4/38; H04L 41/149
USPC .............. 345/156; 455/414.1, 420, 502, 500
See application file for complete search history.

(56) References Cited

U.S. PATENT DOCUMENTS

| | | | | |
|---|---|---|---|---|
| 2016/0007934 A1* | 1/2016 | Arnold | ................. | A61B 5/4809 600/595 |
| 2016/0374614 A1* | 12/2016 | Cavallaro | ............ | A61B 5/1122 702/181 |
| 2017/0210379 A1* | 7/2017 | Obata | ................. | B60W 30/143 |
| 2019/0367102 A1* | 12/2019 | Haban | .................... | B62D 37/02 |
| 2020/0105130 A1* | 4/2020 | Chen | ....................... | H04W 4/02 |
| 2021/0169417 A1* | 6/2021 | Burton | ................. | A61B 5/4857 |
| 2021/0379762 A1* | 12/2021 | Denenberg | ............ | B25J 9/1671 |

* cited by examiner

*Primary Examiner* — Kiet M Doan
(74) *Attorney, Agent, or Firm* — Perkins Coie LLP

(57) ABSTRACT

Methods and systems are described herein for an improved mechanism for authenticating users. In particular, the methods and systems facilitate variable authentication of users on mobile devices based on current and historical physical movement of the mobile devices at geographic locations and during predetermined time intervals while maintaining user privacy. Specifically, methods and systems authenticate users by comparing current motion data to historical motion data to determine if a user must be re-authenticated. For example, current motion data may be inconsistent with historical motion data and may cause re-authentication of a user. As another example, current motion data may be consistent with historical motion data and may not require re-authentication of a user. Moreover, the methods and systems alleviate privacy concerns by not transmitting sensitive data over one or more wired or wireless networks.

20 Claims, 6 Drawing Sheets

METHODS AND SYSTEMS FOR FACILITATING VARIABLE AUTHENTICATION OF USERS ON MOBILE DEVICES

BACKGROUND

In recent years, users have been able to access content from exponentially more devices and in exponentially more locations. However, as users are able to access content on these devices and from these locations, there is a need to ensure that only authorized users are able to access such content. Conventional systems often require the use of passwords and pin codes which requires users to remember these passwords and pin codes. Additionally, unauthorized users may learn these passwords and pin codes and gain access to the content of a user. Furthermore, with ensuring that only authorized users are able to access their content, conventional systems often require users to re-authenticate after a predetermined time period—thereby constantly forcing the user to re-authenticate by putting in their password or pin code when it may not be necessary, which causes a decreased user experience.

SUMMARY

Methods and systems are described herein for an improved mechanism for authenticating users. In particular, the methods and systems facilitate variable authentication of users on mobile devices based on current and historical physical movement of the mobile devices at geographic locations and during predetermined time intervals while maintaining user privacy. By doing so, the methods and systems provide variable authentication requiring the users to re-authenticate only when necessary while also determining if/when mobile device security needs to be increased or decreased. Since users are normally associated with daily, weekly, monthly, or yearly activities, movement data captured by these mobile devices at these geographic locations at these predetermined time intervals are able to assist mobile device security measures by ensuring that users only need to re-authenticate when necessary—thereby relieving user frustration of being forced to constantly re-authenticate. For example, by using the movement data captured by these mobile devices at these geographic locations at these predetermined time intervals, the methods and systems are able to provide variable authentication by requiring users to re-authenticate when an event is detected that is abnormal from their normal daily activities, or not requiring the user to re-authenticate when an event is normal with respect to their daily activities—thereby only forcing a user to re-authenticate when necessary, causing an overall increase in mobile device security.

However, conventional systems have no mechanism for using movement data captured by mobile devices at geographic locations at predetermined time intervals. Additionally, since conventional systems require users to re-authenticate via password(s)/pin code(s) only after the expiration of a predetermined time period, these conventional systems are also less secure (e.g., as unauthorized users may learn these passwords/pin codes).

To solve these technical problems, the methods and systems recite using current and historical movement data, time data, and location data to determine when/if a user needs to re-authenticate. As the system uses the current and historical movement, time, and location data, the system is able to either increase or decrease the current mobile device security. For instance, the system may retrieve current and historical motion data corresponding to a user, compare the current and historical motion data, and provide the comparison to a prediction model to determine a risk level indicating a security threat. Based on the risk level, the system may then determine that a current level of mobile device security does not need to be increased and the user may not need to re-authenticate themselves (e.g., thereby increasing the user's experience). As another example, based on the risk level, the system may determine that the current level of device security needs to be increased and the user may be forced to re-authenticate themselves to access their content (e.g., increasing mobile device security). Furthermore, because the system uses a combination of current and historical movement, time, and location data to determine whether or not to increase or decrease mobile device security, the mobile device's overall security is increased by basing the need to re-authenticate on such data (e.g., as opposed to a simple password/pin code that may be learned by an unauthorized user) while also ensuring that the user's experience is kept to a maximum (e.g., by forcing a user to re-authenticate only when needed).

Furthermore, the use of the movement, time, and location data creates privacy concerns. Additionally, in order to use the movement, time, and location data, the system must store that data, which not only raises privacy concerns, but also increases the amount of data that the system must store. For instance, the movement, time, and location data may contain sensitive data (e.g., the user's location, the times the user is at such location, and the movement data at these times and locations that may be relevant to an activity the user may be doing, etc.) that may raise privacy concerns.

Accordingly, in some embodiments, the movement, time, and location data may be stored on the mobile device such that an on device machine learning model (e.g., a Neural Network (NN), Convolutional Neural Network (CNN), Recurrent Neural Network (RNN), Support Vector Machine (SVM), Core Machine Learning (Core ML), etc.) may assist with generating predictions on whether to increase or decrease the mobile device security based on the movement, time, and location data without transmitting such data over a network (e.g., wireless or wired network)—thereby relieving privacy concerns. In other embodiments, the movement, time, and location data may not be stored on the mobile device, but may be transmitted over a network such that an off device platform (e.g., server, cloud, or other computer system) hosting a machine learning model may use such movement, time, and location data to assist with generating predictions on whether to increase or decrease the mobile device security—thereby alleviating storage concerns associated with the mobile device.

Accordingly, the methods and systems overcome the aforementioned technical problems as well as provide an improved mechanism for authenticating users beyond those of conventional systems.

In some aspects, methods and systems for facilitating variable authentication of users on mobile devices based on current and historical physical movement of the mobile devices at geographic locations and during predetermined time intervals while maintaining user privacy are described. For example, the system may retrieve, via a mobile device, current motion data corresponding to a user, wherein the current motion data indicates a change in position at a current location of the user relative to time. The system may retrieve, via the mobile device, historical motion data corresponding to the user. The system may compare the current motion data to the historical motion data. The system may provide the comparison to a prediction model to determine a risk level, wherein the risk level indicates a likelihood of a security threat corresponding to the user. The system may determine a current level of mobile device security. The system may determine, based on the risk level and the current level of mobile device security, an adjustment of mobile device security, wherein the adjustment of mobile device security is (i) increased based on the risk level exceeding a predetermined threshold value and (ii) decreased based on the risk level failing to exceed the predetermined threshold value. The system may authenticate the user based on a user action corresponding to the adjustment of the mobile device security.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

Figure 1A:
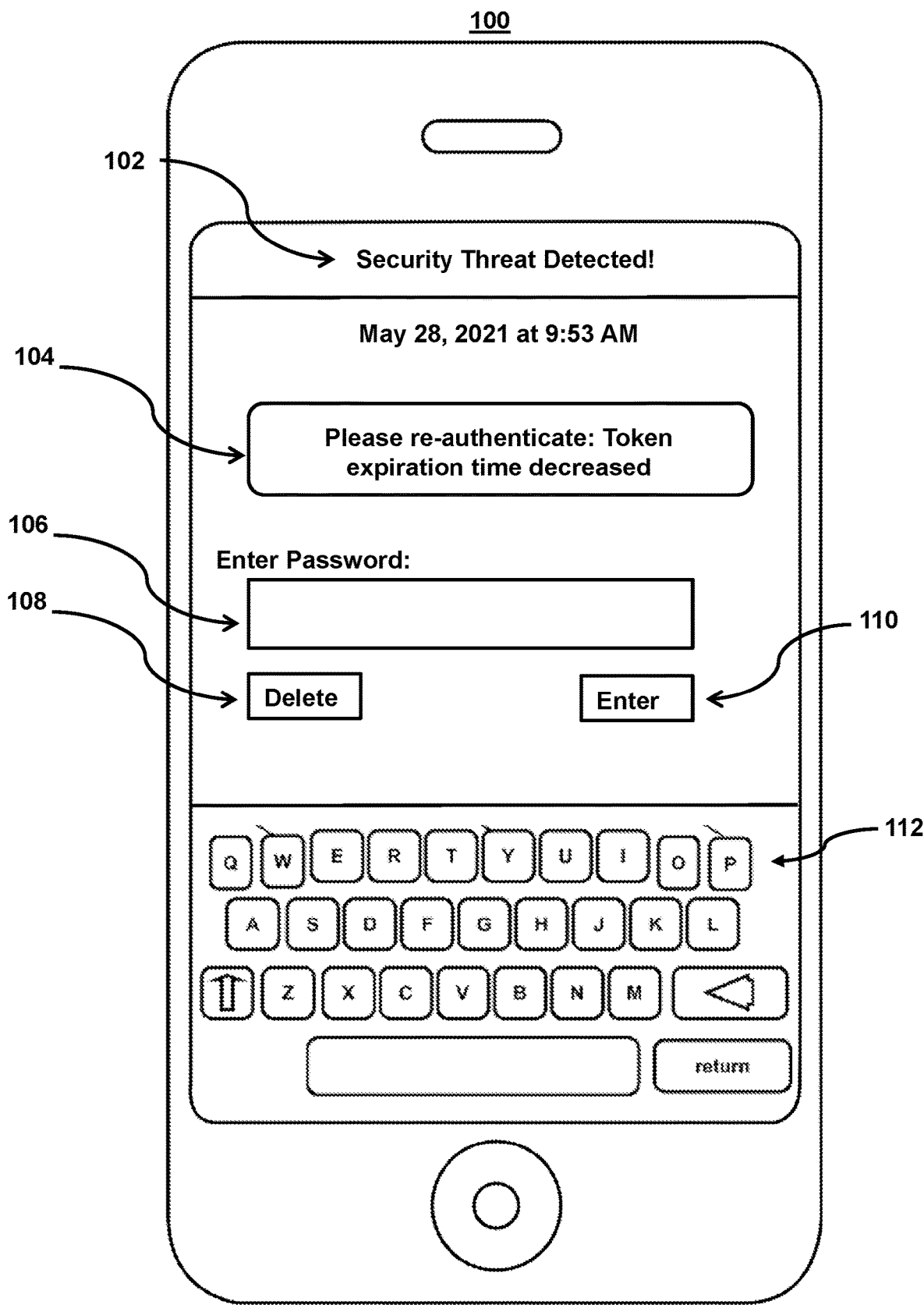
FIG. 1A and FIG. 1B shows an illustrative user interface for facilitating variable authentication of users on mobile devices, in accordance with one or more embodiments.

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention. It should also be noted that the methods and systems disclosed herein are also suitable for applications unrelated to variable authentication users on mobile devices.

Users of mobile devices often store a plethora of content on their mobile devices that needs to be protected from unauthorized users. Additionally, webpages, applications, and other mobile device accessible data that may be accessed from mobile devices also needs protection from unauthorized users. Although users of mobile devices need protection from unauthorized users accessing their content, users also want their user experience to be kept to a maximum (e.g., only requiring authentication when needed). For example, when a user is performing activities that are typical for that user, the user does not want to be forced to constantly authenticate/re-authenticate themselves when accessing their own content. Rather, the user only wants their mobile device to require authentication when an activity outside of their typical or normal bounds occurs (e.g., when the mobile device is stolen, lost, borrowed, etc.). By capturing movement data in reference to geographic locations during times the user is at these geographic locations, the mobile device may generate an activity profile (e.g., based on historical event data) to detect whether a current activity the user is performing is within typical/normal bounds for the user of the device, and may determine based on the activity profile and the current activity being performed whether or not authentication/re-authentication is required.

For example, users may perform activities on a daily, weekly, monthly, or yearly basis. These activities may help assist with variable authentication of users due to the user activities that may be performed in reference to movement data captured with respect to geographic locations at predetermined time intervals. For instance, a user may run every day of the week at Central Park, N.Y. between 8:00 a.m. and 9:00 a.m. As another example, another user may have a meeting at their work office between 2:00 p.m. and 2:30 p.m. every Monday of the year. As a user goes on about their daily, weekly, monthly, or yearly routine, the user's mobile device may capture movement data at these geographic locations at predetermined time intervals (e.g., the times at which the user is at these locations) and may store such data to generate an activity profile for the user. For example, in the case the user runs every day of the week between 8:00 a.m. and 9:00 a.m. at Central Park, N.Y., movement data captured by the user's mobile device may be consistent with that of a running movement (e.g., moving up, down, left to right with a change of location) located at Central Park, N.Y. during the hours of 8:00 a.m. and 9:00 a.m. As another example, when the user has a meeting at their work office between 2:00 p.m. and 2:30 p.m. every Monday of the year, the movement data captured by the user's mobile device may be consistent with that of a working movement (e.g., brief movements up and down for checking their mobile device while staying in a constant location) located at their office between the hours of 2:00 p.m. and 2:30 p.m. The movement, location, and time data may be used to determine if a user's current movement, location, and time data are within "normal bounds" for the user to determine if a user needs to re-authenticate themselves. For example, a security threat may be detected if it is determined that the user "normally" runs every weekday of between 8:00 a.m. and 9:00 a.m. at Central Park, N.Y. but the movement data currently being captured by the user's mobile device indicates that the mobile device is stationary at a different location between 8:00 a.m. and 9:00 a.m. on a weekday. In some embodiments, the user's mobile device may detect that the current activity is not within the user's normal activity profile and may prompt the user to re-authenticate. In this way, the mobile device may increase the user's mobile device security as the mobile device may have been stolen. In come embodiments, the user's mobile device may detect that current activity is within the user's normal activity profile and may not prompt the user to re-authenticate. In this way, the user experience is kept to a maximum by the mobile device not being required to generate multiple notifications to force the user to re-authenticate.

As used herein, motion data may represent data that describes or relates to the action or process of moving or being moved. In some embodiments, motion data may represent data that describes or relates to the process of moving a mobile device. In some embodiments, motion data may represent data that is collected by one or more motion sensors (e.g., proximity sensors, accelerometers, gyroscopes gravity sensors, photosensors, rotational vector sensors, location sensors, GPS receivers, Bluetooth transceivers, Cellular signal transceivers, etc.) and clocks (e.g., a time keeping device) which in some embodiments may be collected by a mobile device. In some embodiments, motion data may represent data that describes or relates to a change in position relative to time. In some embodiments, motion data may represent data that describes or relates to lengths of time at a given location. In some embodiments, motion data may represent data that describes or relates movement with respect to a reference point. In some embodiments, motion data may represent current mobile device movement data (e.g., acceleration, orientation, velocity, tilt, shake, rotation, swing, or the alike), historical device movement data (e.g., historical acceleration, orientation, historical velocity, historical tilt, historical shake, historical rotation, historical swing, or the alike), location data (e.g., current location data, historical location data), and time/date data (e.g., timestamp, date stamp, current time, historical time, current date, historical date, etc.).

As used herein, movement data may represent data that describes or relates to an act of changing a location or position in space. In some embodiments, movement data may represent data that describes or relates to the physical movement of a mobile device. In some embodiments, movement data may represent data collected by one or more motion sensors on a mobile device (e.g., accelerometers, gyroscopes, gravity sensors, photosensors, rotational vector sensors, location sensors, and the alike). In some embodiments, movement data may only represent the data collected by such motion sensors without respect for a location reference point and/or a time reference point. In some embodiments, movement data may represent data that describes or relates to the movement of a mobile device (e.g., up and down, left and right, side to side, tilt, orientation, shake, swing, bouncing, etc.). In some embodiments, movement data may represent the physical movement of a mobile device and/or motions a user acts upon the mobile device.

FIG. 1A shows an illustrative user interface for facilitating variable authentication of users on mobile devices, in accordance with one or more embodiments. For example, FIG. 1A shows first user interface 100. First user interface 100 may correspond to a user interface generated for display by a mobile device (which in some embodiments may correspond to mobile device 204 (FIG. 2) and/or mobile device 300 (FIG. 3) and/or mobile device 422 (FIG. 4)). The first user interface 100 may be a security prompt that notifies a user that a security threat is detected with security message 102. For example, security message 102 may notify a user when a security threat is detected (e.g., an activity is detected that is abnormal from a user's normal activity), and an action message 104 may appear on the user interface to notify the user that the user must re-authenticate and indicate a reason why the user must re-authenticate. For example, action message 104 may notify that the user must re-authenticate with the portion of action message 104 that indicates "Please re-authenticate," and the reason why the user must re-authenticate may be the next portion of the action message 104 that indicates "Token expiration time decreased." Although action message 104 as illustrated as "Please re-authenticate: Token expiration time expired," it should be noted that other messages may be displayed to the user based on a current level of user device security.

In some embodiments, based on action message 104, a user may interact with first user interface 100 to re-authenticate themselves. For example, in some embodiments when a security threat is detected, a user may be required to enter in a password with password input 106 and keyboard 112. The user may further interact with the user interface using delete button 108 (e.g., to clear out a typed password, pin code, or other alphanumeric passphrase) or enter button 110 (e.g., to authenticate themselves using a typed password, pin code or other alphanumeric passphrase). Although FIG. 1A depicts a user authenticating themselves based on a password, it should be noted that other mechanisms for authenticating a user may be used such as, but not limited to, voice recognition, face recognition, image recognition, biometric authentication, gesture authentication, pattern recognition, security question authentication, etc.

Figure 1B:
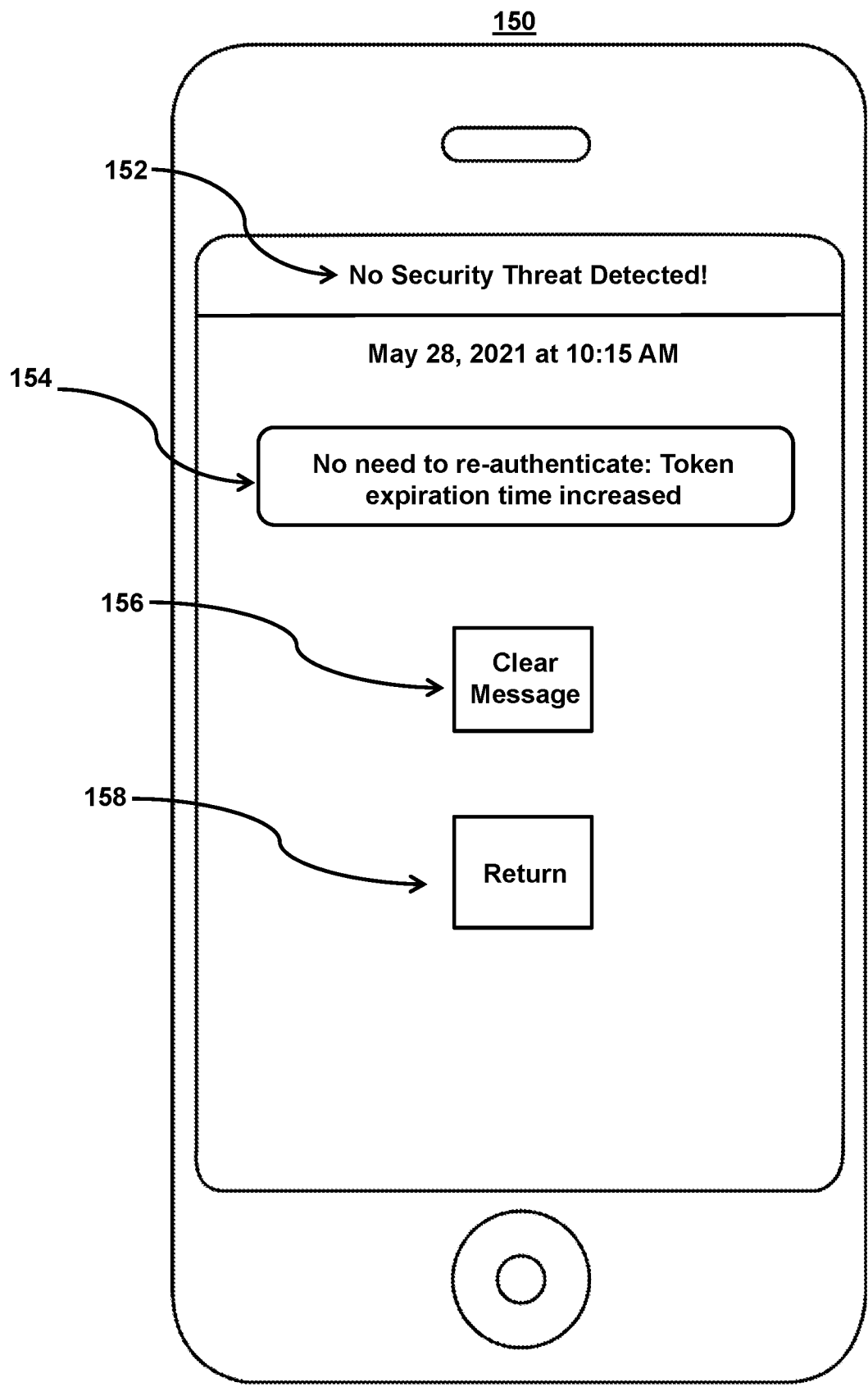

FIG. 1B shows an illustrative user interface for facilitating secure authentication of users based on data known, in accordance with one or more embodiments. For example, FIG. 1B shows second user interface 150 which may be another embodiment of first user interface 100. Second user interface 150 may correspond to a user interface generated for display by a mobile device (which in some embodiments may correspond to mobile device 204 (FIG. 2) and/or mobile device 300 (FIG. 3) and/or mobile device 422 (FIG. 4)). The second user interface 150 may be a security prompt that notifies a user that no security threat is detected with a second security message 152. For example, second security message 152 may notify a user when no security threat is detected (e.g., an activity is detected that is normal/typical of a user's normal activity), and second action message 154 may appear on the user interface to notify the user that the user does not need to re-authenticate and a reason why the user is not required to re-authenticate. For example, second action message 154 may notify that the user does not need to re-authenticate with the portion of second action message 154 that indicates "No need to re-authenticate," and the other portion of second action message 154 that indicates "Token expiration time increased." In such a case that second user interface 150 is generated for display on the mobile device, the user may simply clear the second action message using clear message button 156, or return to the last application, webpage, or other screen the user was previously viewing with return button 158. In some embodiments, second user interface 150 may operate in the background such that a user is not notified when a security threat is detected—thereby keeping user experience to a maximum (e.g., by not displaying unnecessary notifications).

Although the terms "first" and "second" are used in the previous paragraphs describing the different embodiments of the user interface, it should be noted that "first" and "second" should not be construed to denote order, but rather different embodiments of elements of a user interface that may be generated in response to a security condition being detected (e.g., whether or not a security threat is detected).

Figure 2:
FIG. 2 shows an illustrative diagram of a mobile device experiencing motion for facilitating variable authentication of users on mobile devices, in accordance with one or more embodiments.

FIG. 2 shows an illustrative diagram of a mobile device experiencing motion for facilitating variable authentication of users on mobile devices, in accordance with one or more embodiments. As shown in FIG. 2, a user 202 may perform an activity while being associated with mobile device 204 (which in some embodiments may correspond to mobile device 300 (FIG. 3) and/or mobile device 422 (FIG. 4)). As an example, mobile device 204 may capture movement data, location data, and timestamp data while a user 202 is performing activity 200. For instance, in some embodiments, user 202 may run every Monday between 5:15 p.m. and 5:45 p.m. Mobile device 204 may capture the movement data that the mobile device 204 is experiencing, the location of the user, and the time at which the user is performing the activity. This captured data may be stored on mobile device 204 to later compare the captured data (e.g., historical data) to data currently being captured (e.g., current data). In some embodiments, the mobile device 204 may use the data currently being captured as a current activity 200 the user is performing on the mobile device such that mobile device 204 may determine if the current activity 200 is within normal/typical bounds of a user's activity profile—thereby being able to detect if a security threat is present. For example, if mobile device 204 determines that movement data currently being captured is consistent with running movement data (e.g., bouncing up and down, left to right) between 5:15 p.m. and 5:45 p.m. on a Monday at Central Park, N.Y., and historically captured movement, time, and location data indicates the user associated with mobile device 204 is a Monday runner between 5:15 p.m. and 5:45 p.m. at Central Park, N.Y., then mobile device 204 may determine that no security threat is detected—thereby not requiring a user to re-authenticate themselves to access content on mobile device 204. However, if mobile device 204 determines that the movement data currently being captured is not consistent with running movement data, but rather movement consistent with that of a stolen mobile device (e.g., a jerk like movement) between 5:15 p.m. and 5:45 p.m. and at a different location other than Central Park, N.Y., then mobile device 204 may determine that a security threat is detected—thereby requiring the user associated with mobile device 204 to re-authenticate themselves to access content on mobile device 204.

Figure 3:
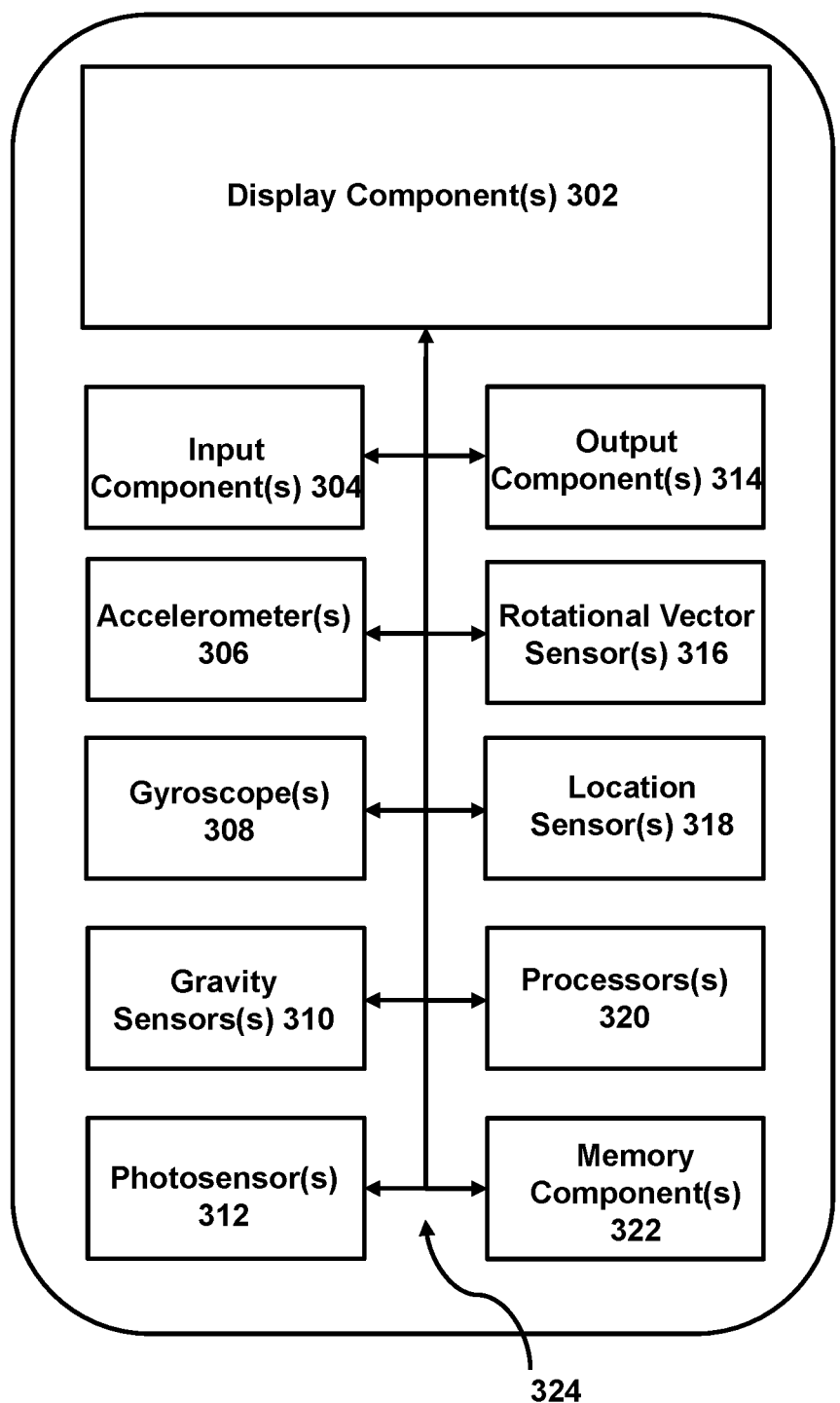
FIG. 3 shows a diagram of a mobile device for facilitating variable authentication of users on mobile devices, in accordance with one or more embodiments.

FIG. 3 shows a diagram of a mobile device for facilitating variable authentication of users on mobile devices, in accordance with one or more embodiments. As shown in FIG. 3, mobile device 300 (which in some embodiments may correspond to mobile device 204 (FIG. 2) and/or mobile device 422 (FIG. 4)) may include one or more components and/or sensors. In some embodiments, mobile device 300 may include display component(s) 302, input component(s) 304, accelerometer(s) 306, gyroscope(s) 308, gravity sensor(s) 310, photosensor(s) 312, output component(s) 314, rotational vector sensors(s) 316, location sensor(s) 318, processor(s) 320, memory component(s) 322, and communication pathway(s) 324. Each of display component(s) 302, input component(s) 304, accelerometer(s) 306, gyroscope(s) 308, gravity sensor(s) 310, photosensor(s) 312, output component(s) 314, rotational vector sensors(s) 316, location sensor(s) 318, processor(s) 320, memory component(s) 322, and communication pathway(s) 324 may include one or more display component(s) 302, input component(s) 304, accelerometer(s) 306, gyroscope(s) 308, gravity sensor(s) 310, photosensor(s) 312, output component(s) 314, rotational vector sensors(s) 316, location sensor(s) 318, processor(s) 320, memory component(s) 322, and communication pathway(s) 324. As described herein, each of display component(s) 302, input component(s) 304, accelerometer(s) 306, gyroscope(s) 308, gravity sensor(s) 310, photosensor(s) 312, output component(s) 314, rotational vector sensors(s) 316, location sensor(s) 318, processor(s) 320, memory component(s) 322, and communication pathway(s) 324 may be referred to as display component 302, input component 304, accelerometer 306, gyroscope 308, gravity sensor 310, photosensor 312, output component 314, rotational vector sensor 316, location sensor 318, processor 320, memory component 322, and communication pathway 324.

Display component 302 may be configured to display information to a user. The information may relate to security threats detected by mobile device 300. For example, in some embodiments, when a security threat is detected, first user interface 100 (FIG. 1A) may be generated for display by mobile device 300, and display component 302 may be configured to display first user interface 100 (FIG. 1A). In other embodiments, when no security threat is detected, second user interface 150 (FIG. 1B) may be generated for display by mobile device 300, and display component 302 may be configured to display second user interface 150 (FIG. 1B). Display component 302 may also be configured to display an interactive user interface (UI) to allow a user to interact with mobile device 300. In some embodiments, display component 302 may be a touch-sensitive interactive display configured to detect touch inputs from a user. In other embodiments, display component 302 may be a Liquid Crystal Display (LCD), Light Emitting Diode (LED) display, Organic Light Emitting Diode (OLED) display, Cathode Ray Tube (CRT) display, Digital Light Processing (DLP) display, or the alike.

Input component 304 may include one or more inputs for interacting with mobile device 300 such as buttons, touch screens, joy sticks, keypads, keyboards, USB ports, SD card reader ports, floppy-disk ports, CD drives, DVD drives, card readers, card scanners, Near Field Communication (NFC) readers, magnetometers, mobile device sensors, and the like. In some embodiments, input component 304 may include voice detection functionalities, retinal scanning, facial recognition, fingerprint scanning functionality, or other biometric identification mechanisms. In some embodiments, input component 304 may detect the presence of other electronic devices proximate to mobile device 300 and may authorize access to one or more functionalities of mobile device 300 based on data communicated from/to the detected electronic devices.

Accelerometer 306 may include one or more types of accelerometers for detecting movement experienced by mobile device 300 such as piezoelectric accelerometers, piezoresistive accelerometers, capacitive accelerometers, single-axis accelerometers, multi-axis accelerometers, and the alike. For example, accelerometer 306 may be configured to measure acceleration experienced by mobile device 300. In some embodiments, accelerometer 306 measurements may be in the form of analog or digital outputs (e.g., analog voltage signals, digital voltage signals, binary values, Alternating Current (AC) signals, Direct Current (DC) signals, etc.).

Gyroscope 308 may include one or more types of gyroscopes for detecting movement experienced by mobile device 300 such as mechanical gyroscopes, gas-bearing gyroscopes, optical gyroscopes, and the alike. For example, gyroscope 308 may be configured to measure the angular velocity experienced by mobile device 300 to determine the orientation of mobile device 300. In some embodiments, gyroscope 308 measurements may be in the form of analog or digital outputs (e.g., analog voltage signals, digital voltage signals, binary values, Alternating Current (AC) signals, Direct Current (DC) signals, etc.).

Gravity sensor 310 may be a combination of accelerometers and gyroscopes of mobile device 300 to determine sudden changes in acceleration and determine the relative force of gravity experienced by the mobile device. For example, gravity sensor 310 may use data from at least one accelerometer and at least one gyroscope of mobile device 300 to determine the force of gravity. For instance, measurements collected by accelerometer 306 and gyroscope 308 may be combined to isolate the force of gravity experienced by mobile device 300.

Photosensor 312 may include one or more types of photo sensors for detecting movement, capturing images, capturing videos, determining orientation of mobile device 300, determining a current location of mobile device 300, facial recognition applications, biometric applications, determining the presence of visible light, determining the presence of Ultra Violet (UV) radiation, Infrared (IR) transmission, etc. In some embodiments, photosensor 312 may include one or more photosensors such as opposed (through-beam), retro-reflective, proximity sensing (diffused), compact cameras, DSLR cameras, mirrorless cameras, action cameras, medium format cameras, traditional film cameras, and other photosensors of the alike.

Figure 4:
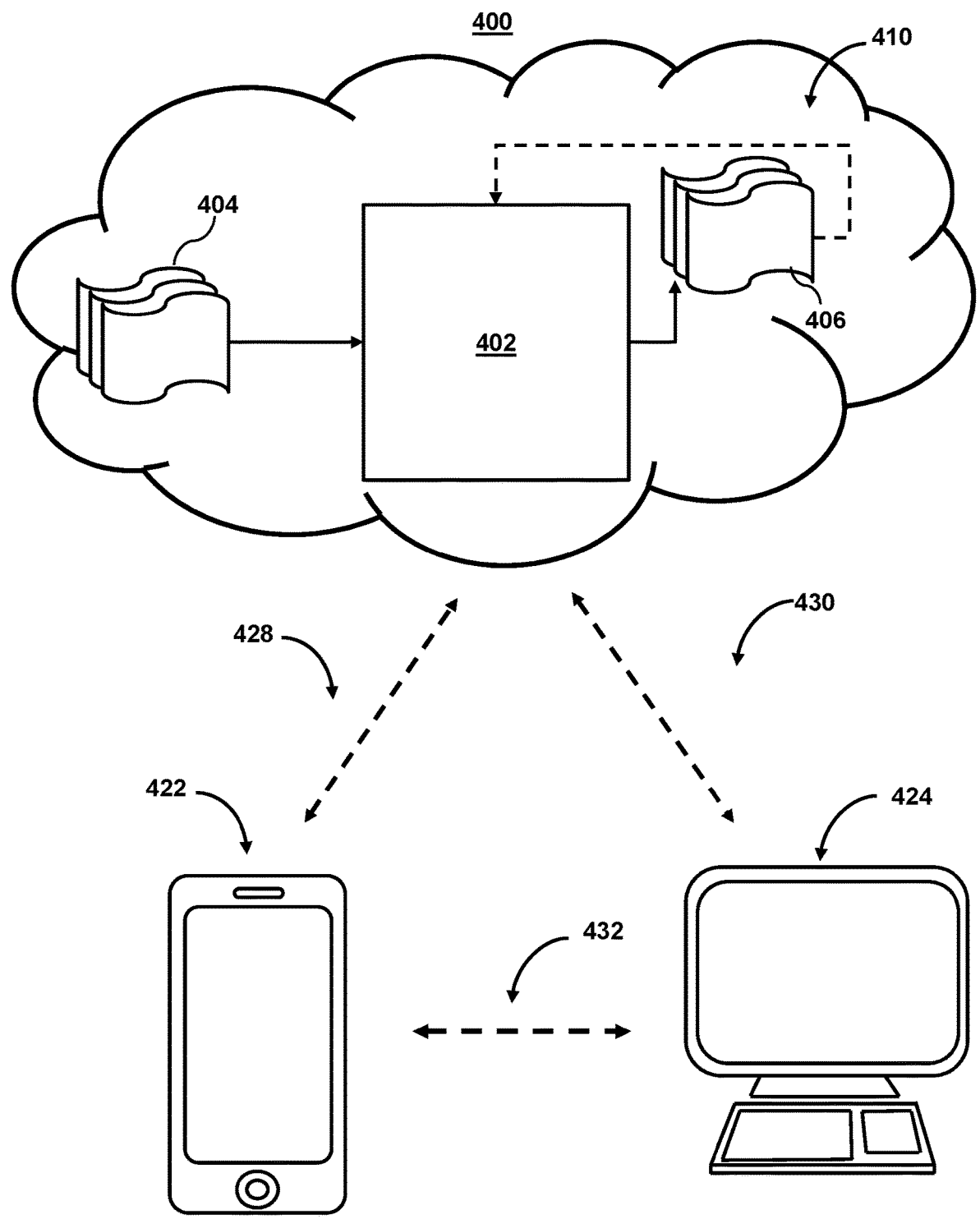
FIG. 4 shows a system diagram for components used to facilitate variable authentication of users on mobile devices, in accordance with one or more embodiments.

Output component 314 may include one or more components configured to output information, items, communications, or other data to one or more users, mobile devices (e.g., mobile device 300), or other components of system 400 (FIG. 4). For example, output component 314 may include USB ports, SD card ports, service ports, printers, communication components (e.g., Wifi components, Bluetooth components, cellular components, NFC components, LTE components, Ethernet, fiber optics, coaxial ports, wired communication components, wireless communication components, or other communication components), display components, speakers, audio jacks, Light Emitting Diodes (LED's), vibrating motors, and the alike. In some embodiments, output component 314 may interact with one or more other components of mobile device 300. For example, output component 314 may communicate with memory component 322, processor 320, and display component 302 to generate for display and display a user interface to a user. In other embodiments, output component may transmit information to other mobile devices, cellular towers, satellites, computing platforms, servers, and the alike.

Rotational vector sensor 316 may be a combination of an accelerometer, magnetometer, and gyroscope of mobile device 300 to determine the orientation of mobile device 300 with respect to Earth's coordinate system. For example, using accelerometer, magnetometer, and gyroscope data captured from mobile device 300, rotational vector sensor 316 may determine the orientation of mobile device 300 as a combination of angle and axis measurements.

Location sensor 318 may include one or more components configured to determine the location of mobile device 300. In some embodiments, location sensor 318 may include one or more location sensors configured to determine the location of mobile device 300 such as Global Positioning System (GPS) receivers, Inertial Navigation Systems (INS), and the alike. In some embodiments, location sensor 318 may be configured to interact with one or more components/sensors of mobile device 300 to determine the location of mobile device 300. For instance, by using triangulation, location sensor 318 may determine the location of mobile device 300 by triangulating received and transmitted cellular signals from cellular towers. As another example, by using trilateration, location sensor 318 may determine the location of mobile device 300 by interacting with one or more satellites. Furthermore, as another example, location sensor 318 may determine the location of mobile device 300 by using Bluetooth functionalities of mobile device 300 by connecting to one or more Bluetooth beacons and using trilateration.

Processors 320 may be programmed to provide information processing capabilities for mobile device 300. Processors 320 may include one or more of a digital processor, an analog processor, a digital circuit designed to process information, an analog circuit designed to process information, a state machine, and/or other mechanisms for electronically processing information. In some embodiments, processors 320 may include a plurality of processing units. These processing units may be physically located within the same device, or the processors may represent processing functionality of multiple mobile devices 300 operating in coordination. Processors 320 may be programmed to execute computer program instructions to perform functions related to mobile device 300. Processors 320 may be programmed to execute computer program instructions by software; hardware; firmware; some combination of software, hardware, or firmware; and/or other mechanisms for configuring processing capabilities on the processors.

Memory component 322 may include one or more electronic storages that may include non-transitory storage media that electronically stores information therein. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein. Additionally, memory component 322 may store information related to the one or more components/sensors of mobile device 300 including, but not limited to movement, motion, location, time, position, velocity, acceleration, photo, video, audio, or other data that occurs on mobile device 300.

Communication pathways 324 may be configured to allow one or more components/sensors of mobile device 300 to communicate, transmit, and/or receive data with one another. In some embodiments, communication pathways 324 may be that of wired or wireless connections such that each component/sensor of mobile device 300 may be able to exchange information from one component/sensor to another.

FIG. 4 shows a system diagram for components used to facilitate variable authentication of users on mobile devices, in accordance with one or more embodiments. As shown in FIG. 4, system 400 may include mobile device 422 and user terminal 424 (which in some embodiments may be used to display first user interface 100 (FIG. 1A) or second user interface 150 (FIG. 1B)). While shown as a smartphone and personal computer, respectively, in FIG. 4, it should be noted that mobile device 422 and user terminal 424 may be any computing device, including, but not limited to, a laptop computer, a tablet computer, a hand-held computer, other computer equipment (e.g., a server), including "smart," wireless, wearable, and/or mobile devices. FIG. 4 also includes cloud components 410. Cloud components 410 may alternatively be any computing device as described above and may include any type of mobile terminal, fixed terminal, or other device. For example, cloud components 410 may be implemented as a cloud computing system and may feature one or more component devices. It should also be noted that system 400 is not limited to three devices. Users may, for instance, utilize one or more devices to interact with one another, one or more servers, or other components of system 400. It should be noted that, while one or more operations are described herein as being performed by particular components of system 400, those operations may, in some embodiments, be performed by other components of system 400. As an example, while one or more operations are described herein as being performed by components of mobile device 422, those operations may, in some embodiments, be performed by components of cloud components 410. In some embodiments, the various computers and systems described herein may include one or more computing devices that are programmed to perform the described functions. Additionally, or alternatively, multiple users may interact with system 400 and/or one or more components of system 400. For example, in one embodiment, a first user and a second user may interact with system 400 using two different components.

With respect to the components of mobile device 422, user terminal 424, and cloud components 410, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 4, both mobile device 422 and user terminal 424 include a display upon which to display data (e.g., as shown in FIG. 3).

Additionally, as mobile device 422 and user terminal 424 are shown as touchscreen smartphones and computers, respectively, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 400 may run an application (or another suitable program). The application may cause the processors and/or control circuitry to perform operations related to generating alternative content.

Each of these devices (e.g., mobile device 422 and user terminal 424) may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 4 also includes communication paths 428, 430, and 432. Communication paths 428, 430, and 432 may include the Internet, a mobile phone network, a mobile voice or data network (e.g., a 5G or LTE network), a cable network, a public switched telephone network, or other types of communications networks or combinations of communications networks. Communication paths 428, 430, and 432 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 410 may be a database configured to store user data for a user. For example, the database may include user data that the system has collected about the user through prior interactions, both actively and passively. Alternatively, or additionally, the system may act as a clearing house for multiple sources of information about the user. This information may be compiled into a cross-platform profile. For example, one or more of cloud components 410 may include a microservice and/or components thereof. In some embodiments, the microservice may be a collection of applications that each collect one or more of the plurality of variables.

Cloud components 410 may include model 402, which may be a machine learning model. Model 402 may take inputs 404 and provide outputs 406. The inputs may include multiple datasets such as a training dataset and a test dataset. Each of the plurality of datasets (e.g., inputs 404) may include data subsets related to user data, original content, and/or alternative content. In some embodiments, outputs 406 may be fed back to model 402 as inputs to train model 402. For example, the system may receive current and historical motion data corresponding to a user. The system may then train a machine learning model based on the received current and historical motion data to generate predictions related to a risk level corresponding to the user. The generated predictions related to the risk level corresponding to the user may be fed back to the machine learning model to further train the machine learning model. In some embodiments, cloud components 410 may be integrated into mobile device 422 and/or user terminal 424 such that cloud components 410 may operate in an on-device fashion—thereby alleviating privacy concerns with transmitting sensitive user data over one or more wired or wireless communication pathways 428, 430, and 432.

In another embodiment, model 402 may update its configurations (e.g., weights, biases, or other parameters) based on the assessment of its generated synthetic images (e.g., outputs 406) and reference feedback information (e.g., user indication of accuracy, reference labels, or other information). In another embodiment, where model 402 is a neural network, connection weights may be adjusted to reconcile differences between the neural network's output and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 402 may be trained to generate better predictions.

In some embodiments, model 402 may include an artificial neural network. In such embodiments, model 402 may include an input layer and one or more hidden layers. Each neural unit of model 402 may be connected with many other neural units of model 402. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 402 may be self-learning and trained, rather than explicitly programmed, and can perform significantly better in certain areas of problem solving, as compared to traditional computer programs.

In some embodiments, model 402 may include multiple layers (e.g., where a signal path traverses from front layers to back layers). In some embodiments, back propagation techniques may be utilized by model 402 where forward stimulation is used to reset weights on the "front" neural units. In some embodiments, stimulation and inhibition for model 402 may be more free-flowing, with connections interacting in a more chaotic and complex fashion. During testing, an output layer of model 402 may indicate whether or not a given input corresponds to a classification of model 402.

Figure 5:
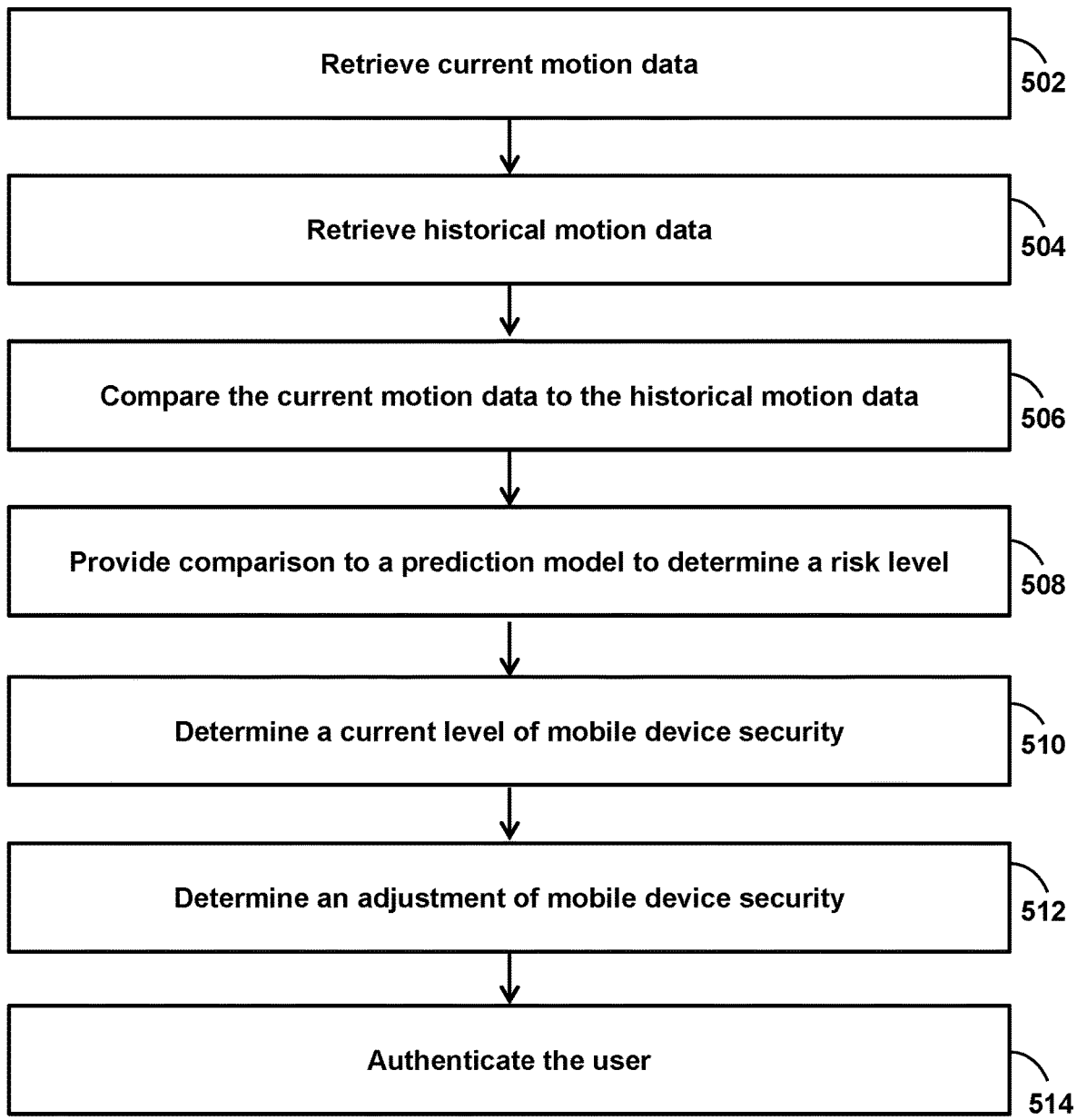
FIG. 5 shows a flowchart of steps for facilitating variable authentication of users on mobile devices, in accordance with one or more embodiments.

FIG. 5 shows a flowchart of steps for facilitating variable authentication of users on mobile devices, in accordance with one or more embodiments. For example, process 500 may represent the steps taken by one or more devices as shown in FIGS. 1-4. For example, process 500 may be performed by a mobile device system that includes a memory configured to store a prediction model and historical user motion data, control circuitry, and I/O circuitry. In some embodiments, process 500 may represent the steps taken for facilitating variable authentication of users on mobile devices based on current and historical physical motion of the mobile devices at geographic locations and during predetermined time intervals while maintaining user privacy.

At step 502, process 500 retrieves (e.g., using one or more components of system 400 (FIG. 4)) current motion data. For example, the system may retrieve, via a mobile device, current motion data corresponding to a user. As an example, the current motion data may include current geographic location information, the current date and time information corresponding to the current location information, current movement data corresponding to the current location information (e.g., data associated with one or more motion sensors) and other information. For example, the current motion data may indicate a change in position at a current location of the user relative to time.

Additionally or alternatively, the current motion data may include current location data. The system may obtain current location information from one or more resources including, but not limited to, one or more databases, GPS receivers, cellular towers, Bluetooth beacons, and the alike. For example, the system may obtain current location data by interacting with one or more satellites. For instance, the system may obtain information transmitted from the one or more satellites which may include timestamps and position stamps. The information transmitted from the one or more satellites may be in the form of an electromagnetic signal conveying information that includes the timestamp and position stamp information. In some embodiments, the system may interact with four or more satellites where each satellite transmits an electromagnetic signal to the system indicating the timestamp (e.g., the time the signal is transmitted from the satellite), and the position stamp (e.g., the position of the satellite), respectively. The system may store the timestamp and position stamp information in a memory component of mobile device 422 (which in some embodiments may correspond to mobile device 204 (FIG. 2) and/or mobile device 300 (FIG. 3)) or user terminal 424 (which in some embodiments may correspond to mobile device 204 (FIG. 2) and/or mobile device 300 (FIG. 3) and/or mobile device 422 (FIG. 4)). The system may then record a timestamp corresponding to when each electromagnetic signal is received from each respective satellite.

As an example, in the case that a first satellite transmits an electromagnetic signal conveying first timestamp and first position stamp information to the system, the system may record a second timestamp corresponding to when the first satellite's electromagnetic signal was received. In some embodiments, the second timestamp (e.g., the time of reception of the first satellite's signal) is based on a clock (or other time measurement device) that is associated with one or more components of the system. For instance, mobile device 422 may include an on-device clock and may record the second timestamp with respect to the on device clock when the first satellite's electromagnetic signal is received. In this way, the system may be configured to compute a difference between the first timestamp (e.g., when the first satellite transmitted its electromagnetic signal) and the second timestamp (e.g., when the system received the first satellite's electromagnetic signal). The system may then store the first timestamp, first position stamp, second timestamp information, and the difference between the first timestamp and the second timestamp in one or more memory components of the system. This process may be repeated for each satellite that the system is interacting with. In some embodiments, the system may use the difference between each timestamp (e.g., the difference in time recorded from the reception of each electromagnetic signal of each satellite and the time of reception to the system) and each satellite's position stamp to determine the current location of the system. For example, to determine the current location of mobile device 422, the time difference between when each satellite transmits their respective electromagnetic signal and the time of reception of each electromagnetic signal with respect to a clock device of mobile device 422, mobile device 422 may use trilateration based on the time difference, multiplying the time difference by the speed-of-light) and the position stamp from each respective satellite. For example, by knowing the position (e.g., in space) of each satellite and the time differences as described herein (e.g., the respective position stamps), the system may use trilateration to determine the current location of mobile device 422.

Additionally or alternatively, the current motion data may include accelerometer information. For example, the system may obtain accelerometer information. For example, the system may receive information in the form of accelerometer signals from an accelerometer. The accelerometer signals may be analog or digital signals (e.g., voltage signals, binary signals, sinusoidal signals, etc.). In some embodiments, the system may receive accelerometer signals and store the accelerometer signals to compare the accelerometer signals to an accelerometer signal threshold level. For example, the system may compare the received accelerometer signals to an accelerometer signal threshold. The accelerometer signal threshold level may be a predetermined level for identifying if the system is experiencing acceleration (e.g., movement or other motion). For example, in the case that the received accelerometer signal is a voltage signal, the system may compare the voltage signal transmitted by the accelerometer and compare it to a voltage signal threshold value. For example, the voltage signal may be 1 mV, and the voltage signal threshold may be 0.5 mV. Based on the voltage signal being greater than or equal to the voltage signal threshold, the system may determine that the system is experiencing motion, movement, a change in orientation, a change in position, acceleration, etc. In some embodiments, when the voltage signal is less than the voltage signal threshold, the system may determine that the system is at rest as opposed to experiencing motion, movement, a change in orientation, a change in position, acceleration, etc. Although 1 mV and 0.5 mV are used in the example above, it should be noted that these values may be different based on the type of accelerometer. For instance, the system may receive a voltage signal from an accelerometer indicating 0.3 mV and the voltage signal threshold may be 0.2 mV. In some embodiments, instead of an absolute voltage (e.g., 0.0 mV, 0.1 mV, 0.2 mV, . . . , 1.0 mV, 1.5 mV, and so on), the voltage signal may be a binary value with a "1" or a "0" indicating that the system is experiencing motion, movement, a change in orientation, a change in position, acceleration, and the alike.

At step 504, process 500 retrieves (e.g., using one or more components of system 400 (FIG. 4)) historical motion data. For example, the system may retrieve, via a mobile device, historical motion data corresponding to a user. As an example, the historical motion data may include historical geographic location information, historical date and time information corresponding to the historical geographic location information, historical movement data corresponding to the historical geographic location information (e.g., data associated with one or more motion sensors), and other information.

Additionally or alternatively, the historical motion data may include information related to a set of locations the user has previously traveled, movement data associated with the set of locations the user has previously traveled, and timestamp data associated with the set of locations the user has previously traveled. For instance, a user may have previously visited a coffee shop (e.g., a location) at 11:00 a.m. to 11:30 a.m. every Monday (e.g., timestamp data) to buy a coffee. During the user's visits to the coffee shop, the user may have picked up their mobile device to check text messages, email, or the alike. While the user was checking their text messages, movement may have been experienced by the system and the system may have recorded such movement data, location data (e.g., the coffee shop) and the timestamp data (e.g., every Monday from 11:00 a.m. to 11:30 a.m.). In this way, the system may keep a record of such movement, location, and timestamp data as historical motion data in one or more memory components of the system to later act as an activity profile indicating a user's typical behavior. Although one example is indicated above (e.g., visiting a coffee shop every Monday between 11:00 a.m. to 11:30 a.m.), other instances of where a user may have visited may be included in such historical motion data that includes other previously visited locations, their corresponding timestamps, their corresponding movement data, and other information.

Additionally or alternatively, the historical motion data may include historical mobile device sensor data. For example, the historical mobile device sensor data may include historical accelerometer sensor data, historical gyroscope sensor data, historical photosensor data, historical rotational vector sensor data, or historical geolocation sensor data. Each type of historical mobile device sensor data may include information associated with movement experienced by a mobile device. For example, each mobile device sensor may record different types of movement data associated with movement that is experienced by the system (e.g., the accelerometer may measure data associated with the acceleration being experienced by the system, the gyroscope may measure the orientation of the system, etc.).

At step 506, process 500 compares (e.g., using one or more components of system 400 (FIG. 4)) the current motion data to the historical motion data. For example, the system may compare the current motion data to the historical motion data that corresponds to a user.

Additionally or alternatively, the current motion data may include current device sensor data (e.g., data currently being obtained from one or more components of system 400 (FIG. 4)). For instance, the current device sensor data may include different types of physical sensor data such as, accelerometer sensor data, gyroscope sensor data, photosensor data, rotational vector sensor data, or geolocation sensor data. In some embodiments, the historical motion data may include historical device physical sensor data (e.g., sensor data that has been previously collected from one or more components of system 400 (FIG. 4)). For instance, the historical device sensor data may include different types of sensor data such as accelerometer sensor data, gyroscope sensor data, photosensor data, rotational vector sensor data, or geolocation sensor data.

Additionally or alternatively, the system may compare the current motion to the historical motion data. For instance, the system may determine a set of current values for each type of current sensor data of the current mobile device sensor data (e.g., current accelerometer sensor data, current gyroscope sensor data, current photo sensor data, current rotational vector sensor data, or current geolocation sensor data). The system may also determine a set of historical values for each type of historical sensor data of the historical mobile device sensor data (e.g., historical accelerometer sensor data, historical gyroscope sensor data, historical photosensor data, historical rotational vector sensor data, or historical geolocation sensor data). In this way, the system may provide secure authentication of users by comparing a current motion data (e.g., current location, time, and movement data) to historical motion data (e.g., historical current location, time, and movement data) to ensure that the user that is in possession of the mobile device is actually the user who is authorized to use such device (e.g., an unauthorized user would have an inconsistent current motion data captured with respect to the historical motion data).

In some embodiments, the historical motion data may be stored (using one or more components of system 400 (FIG. 4)) in an activity log format. For example, the activity log format may include an instance of each type of sensor data relative to the time/date it was recorded. For example, when a user visits a geographic location (e.g., a bank) at a certain time and day (e.g., 2:00 p.m.-2:15 p.m. on every Tuesday), the system may record sensor data and store it as an activity in an activity log of one or more components of the system. For example, an activity may include each type of sensor data (e.g., current accelerometer sensor data, current gyroscope sensor data, current photo sensor data, current rotational vector sensor data, and current geolocation sensor data) and associate data obtained from each sensor with timestamps and location stamps indicating when and where such data is collected. In this way, the stored data can be accessed for later use for determining an activity profile of the user—thereby increasing the user device security by authenticating users that follow daily, monthly, weekly, or yearly routines.

Each value for each type of current and historical sensor data may be expressed in units that correspond to the type of sensor data (e.g., accelerometer sensor data may be expressed in voltage levels) that is consistent with the output signals of each type of sensor. As another example, accelerometer sensor data may be expressed in a binary unit where a binary "1" represents that the system is experiencing movement and where a binary "0" represents that the system is not experiencing movement. As another example, geolocation sensor data may be expressed in GPS coordinates, cartesian coordinates, degrees, minutes, seconds, or any other metric of determining a location. Once the system has determined a set of values for each type of sensor data of the current and historical device sensor data, system 400 may determine a difference between each corresponding set of values. For example, since the historical device sensor data includes a plurality of instances where a user has visited a location, the dates/times the user has visited the location, and the movement data associated with the location, each instance's data may be compared to the current device sensor data such that a difference is determined between each type of device sensor value. The system may use this difference as a comparison to provide a prediction model (e.g., machine learning model) to generate a risk score that indicates a security threat with respect to the user.

For example, a user that has previously visited a coffee shop between 11:30 a.m. and 12:00 p.m. every Monday may have 25 instances of visiting the coffee shop between 11:30 a.m. and 12:00 p.m. Additionally, each instance of the user visiting the coffee shop between the specified date/time periods may include the user's mobile device sensor data that was obtained at such date/time periods. The system may then compare the data associated with each instance to the current device's sensor data and determine a difference between each instance's sensor data for each type of sensor data. Once the difference(s) are determined, the difference(s) may be used by a prediction model to determine a risk level associated with the user based on the current and historical motion. For example, the risk level may be associated with a security threat corresponding to the user. In some embodiments, the greater the difference between each instance's sensor data for each type of sensor data, the higher the likelihood of a security threat that may correspond to the user.

At step 508, process 500 may provide the comparison (using one or more components of system 400 (FIG. 4)) to a prediction model. For example, the system may provide the comparison to a prediction model to determine a risk level. In some embodiments, the risk level may indicate a likelihood of a security threat corresponding to a user. For example, the risk level may be expressed in a quantitative fashion (e.g., a score, number, percentage, etc.). Alternatively or additionally, the risk level may be expressed in a qualitative fashion (e.g., "high", "low", "medium", etc.).

Additionally or alternatively, the prediction model may be an on-device machine learning model. For example, in order to alleviate privacy concerns of sending sensitive mobile device data over one or more wired or wireless networks, an on-device machine learning model may be employed to keep nefarious entities from intercepting such data. For example, the system may provide the comparison to an on-device machine learning model such that one or more components of the system may process and generate predictions related to a security threat corresponding to a user. One such example of an on-device machine learning model that may be employed may be a Core-ML machine learning model. The Core-ML machine learning model may have properties that allow the model to operate on a device (e.g., decreased processing and energy requirements) that other machine learning models may lack.

Additionally or alternatively, the system may generate a current event and a set of historical events. For example, the system may generate a current event based on the current motion data. The current event may include a current user location, movement data associated with the current user location, timestamp data associated with the current user location, and other information. As used herein, a current event may represent an event a user is currently participating in. For example, the system may determine that the user may be currently located at their local gym. The system may further determine that the user arrived at 6:00 a.m. and is currently exercising (e.g., due to one or more components of the system detecting movement data consistent with that of exercising) at 6:15 a.m. on a Monday morning. Based on the systems determination of the user currently exercising between 6:00 a.m. and 6:15 a.m., the system may generate a current event (e.g., that the user is exercising between 6:00 a.m. and 6:15 a.m.) based on such data. The system may also generate a set of historical events based on historical motion data. As used herein, a historical event may represent an event a user has previously participated in. For example, each historical event of the set of historical events may include a location the user has previously traveled, movement data associated with the location the user has previously traveled, and timestamp data associated with the location the user has previously traveled. For example, the system may index previously captured motion data to determine locations the user has previously traveled, movement data associated with the locations the user has previously traveled, and timestamp data associated with the locations the user has previously traveled and generate a set of historical events. For example, as a user uses their mobile device over a period of time (e.g., a second, a minute, an hour, a day, a week, a month, a year, etc.) the user's mobile device may constantly capture location information, movement data associated with each location the user visits, and timestamp information associated with each location the user visits. Based on this captured information, the system may generate a set of historical events to determine an activity profile of the user.

For example, a user's mobile device may determine that the user is a Saturday runner at a local park between 5:00 p.m. and 8:00 p.m., a Wednesday bicyclist on a local trail between 7:00 a.m. and 8:00 a.m., takes part in a monthly meeting at their office every third Tuesday of every month between 1:00 p.m. and 2:00 p.m., attends a yearly doctor appointment at Albany Medical center between 3:00 p.m.

and 4:00 p.m., etc. The system may make such determinations based on the location, time, and movement data associated with each event. For instance, the system may determine that when a user is at their office (e.g., a location) the user may be in a meeting if the motion data captured between 1:00 p.m. and 2:00 p.m. on a third Tuesday of the month is consistent with movement data that indicates a user sitting (e.g., non-rapid movements) and periodically lifting their phone (e.g., occasional orientation changes, up and down and side to side movements, etc.). The system may then generate a set of corresponding events where the set of corresponding events indicates each instance of the historical events that is the same or similar to the current event. For example, as a user goes about their daily, weekly, monthly, or yearly routines, the same or similar events may occur. A corresponding event, as used herein, is an event that is the same or similar to another event. For example, if a current event is determined to be an event associated with a Saturday runner at a local park between 5:00 p.m. and 5:30 p.m., a corresponding event may be another event that is associated with a Saturday runner at the same local park between 5:00 p.m. and 5:30 p.m. As another example, if a current event is determined to be an event associated with a Monday runner at a local track between 1:00 p.m. and 1:30 p.m., a corresponding event may be another event that is associated with a Monday runner at a different track that is proximate to the local track between 1:15 p.m. and 1:45 p.m. In this case, although the two events are not identical, the system may nonetheless determine the two events to be corresponding events based on being similar to one another. The similarity between two corresponding events may be determined by one or more machine learning models (e.g., a neural network) which takes each event as inputs to the model, weighs input features differently (e.g., the time, location, and movement data) and generates predictions of how similar the two events are. The level similarity may be expressed in a quantitative fashion (e.g., a score, number, etc.). Additionally or alternatively, the level of similarity may be expressed in a qualitative fashion (e.g., "close", "identical", "different", etc.). Based on the similarity amongst two events satisfying (e.g., greater than, less than, etc.) a predetermined similarity threshold value (e.g., a quantitative or qualitative value), the system may determine two events are corresponding events. The set of corresponding events may be generated based on a match between a location range, a movement data range, and a timestamp range between the current event and the set of historical events.

Additionally or alternatively, the system may determine a location range. For example, the location range may be used to generate the set of corresponding events. For example, the system may determine a set of locations the user has previously traveled based on historical event data. The system may compare each location included in the historical event data to one another to identify a set of proximate locations. As used herein, a proximate location may represent a location that is close to (e.g., proximate) to another location. Because users often visit same or similar locations throughout their lives, a location range to identify if a user is at a same or similar location may be needed. For example, if the user historically runs along a first path at a particular location (e.g., their local park), the user may run along a second path that is similar but not identical to the first path. As another example, if the user historically sleeps in a first room of their house, the user may sleep in a second room of their house that is similar but not identical to the first room. Although the exact locations in the examples above differ by a distance factor (e.g., an inch, a foot, a centimeter, a meter, a fraction of a mile, a fraction of a kilometer, etc.), these locations generally represent the same location—therefore by the system using a location range, the corresponding events may be generated such that the corresponding events indeed correspond to one another such that the system can account for minor variations in location data. To account for these minor variations in location data, the system may identify a set of proximate distances from one location to another location included in the historical event data. For example, the historical event data may include a plurality of locations the user has previously visited. The system may select a first location (e.g., a local park), and calculate the distance from the first location to a second location (e.g., a parking lot). This process may be repeated for each location of the set of locations that the user has previously traveled to. If the distance from the first location and the second location is within a proximity threshold condition (e.g., the first location is within a predetermined distance of the second location), the system may determine that the second location (e.g., the parking lot) as a proximate location with respect to the first location. The proximity threshold condition may be a predetermined distance apart from one another (e.g., 0.01 mile, 0.1 mile, 1 mile, 10 miles, 0.01 kilometers, 0.1 kilometers, 1 kilometers, 10 kilometers, etc.). The predetermined distance may be preset by the system or one or more system administrators. For example, the proximity threshold condition may be 0.2 miles away from the first location to the second location (e.g., the second location must be within 0.2 miles of the first location). Once the system has determined the set of proximate distances, the system may average the set of proximate distances together to determine a location range for each location of the set of locations the user has previously traveled. The location range may be based on the average of proximate distances that accounts for discrepancies that may be present in obtained location data. As an example, if the averaged set of proximate distances is 0.01 miles, the location range for a location would be 0.01 miles away from that location. For instance, if the system determines a first location to be Central Park, N.Y., based on the average of proximate distances (e.g., being 0.01 miles), a second location (e.g., a parking lot) may be "within range" if the second location is 0.005 miles away from the first location. In this way, the system may alleviate discrepancies between location data that has been obtained (e.g., a system error when obtaining the location, ensuring that one location corresponds to another location that are similar but not identical, etc.).

Additionally or alternatively, the system may determine a movement data range. For example, the movement data range may be used to generate the corresponding events. Since users often do not perform the same exact movements with respect to an event, there may be differences in movement data collected during such events. For example, when a user goes for a morning run, the movement data collected during a first instance (e.g., a Saturday morning run) may not be identical to the movement data collected during a second instance (e.g., a Monday morning run). As an example, the movement data collected during the Saturday morning run may have minor differences as compared to the Monday morning run. Although the events are similar (e.g., they are both an instance where a user is running), the system may account for discrepancies between the movement data collected during each instance to ensure that the system may properly identify the type of activity (e.g., running). To accomplish this, the system may determine a set of locations the user has previously traveled (e.g., based on the historical event data), and compare each location to each other to determine a set of corresponding locations (e.g., the user visiting the same location). The system may then identify based on such comparison the movement data associated with each location the user has previously traveled and may generate a set of movement data values for each location the user has previously traveled. For example, the set of movement data values may include a plurality of different types of movement data values for each sensor that obtained the movement data. For instance, a user may have previously traveled to a local park to run. During the user's visit, one or more components of system 400 (e.g., the sensors of mobile device 422) may have collected accelerometer information, gyroscope information, rotational vector sensor information and the alike. Each type of sensor may output varying output signals that correspond to different values (e.g., an accelerometer may output an electrical signal of 0.2 mV to indicate acceleration as compared to a gyroscope that may output an electrical signal of 0.4 mV to indicate an orientation). Therefore, the system may determine a set of movement data values that are associated with each location the user has previously traveled. The system may then determine a movement data range for each location of the set of locations the user has previously traveled by averaging each type of movement data values of the set of movement data values with respect to each location the user has previously traveled and with respect to each type of movement data value obtained, and then further comparing the average of each movement data value of the set of movement data values to a predetermined movement threshold value. For example, continuing with the Saturday and Monday runner example above, the system may average the accelerometer information together from Saturday and Monday run at the local park, the gyroscope information together from Saturday and Monday morning run at the local park, and so on to determine the averages for each type of sensor for each location of the set of locations the user has previously traveled. The average of movement data values may be compared to a predetermined movement threshold value (e.g., an integer, number, binary value, etc.) that accounts for discrepancies that may be present in the movement data values that are obtained. For instance, if the average accelerometer movement data value for a first location is 0.3 mV, the predetermined movement threshold value may be +/−0.05 mV, or other value. As another example, the average accelerometer movement data value for a second location is 0.1 mV, the predetermined movement threshold value may be +/−0.01 mV. In this way, the system may correspond different values of movement data collected for each sensor with respect to each location. For instance, if the user is a Saturday runner in Central Park, N.Y., the average accelerometer movement data collected at this location may be) 0.3 mV. The user may run faster next week than on the previous week and the average accelerometer movement data may be 0.35 mV. Thus, in the case that the predetermined movement threshold value is +/−0.05 mV, the average accelerometer movement data may be within the movement data range for the particular location (e.g., Central Park, N.Y.). This process may be repeated for each type of sensor data obtained in the set of movement data values. In this way, the system may account for differences between movement data collected between two similar events at the same or similar location—thereby reducing errors when determining if the movement data collected at these locations are indeed consistent with a user's typical activities.

Additionally or alternatively, the system may determine a timestamp range. For example, the timestamp range may be used to generate the corresponding events. As users often perform similar activities with respect to their daily, weekly, monthly, and yearly routines during similar but not identical times. Therefore, in order to address minor discrepancies between the times/dates at which these activities occur, a timestamp range may be used to determine if one event corresponds to the same or similar event. In order to accomplish this, the system may determine based on the historical event data, a set of locations the user has previously traveled. The system may then compare each location of the set of locations to each other (e.g., to find similar locations). The system may further identify timestamp values associated with each location the user has previously traveled and average such timestamp values together to determine a timestamp range. For example, a user may visit a local park at 4:00 p.m. to take an afternoon walk on a Monday, but may visit the same local park at 4:20 p.m. on the next Monday to take the afternoon walk. Although the time that the user visits the local park are not identical, the two events are nonetheless corresponding events albeit the difference in time. Therefore, the system may average the arrival timestamps together (e.g., 4:00 p.m. and 4:20 p.m.) and get an average arrival timestamp of 4:10 p.m. The system may then determine the timestamp range based on the average timestamp value and a predetermined timestamp threshold value. The predetermined timestamp threshold value may be a preset value in seconds, minutes, hours, or the alike and may be preset by the system (e.g., a default value) or preset by a system administrator such that the two events may still be properly identified as corresponding events although there is a minor difference in timestamp data. For example, the predetermined timestamp threshold value may be +/−20 minutes. This process may be repeated for each location of the set of locations the user has previously traveled to determine a timestamp range for each location the user has previously traveled. For instance, continuing with the example above (e.g., visiting the local park), if the average arrival timestamp is 4:10 p.m. for that particular location, and the user on another day visits the park at 4:29 p.m., if the predetermined timestamp threshold value is +/−20 minutes, then the system may determine that the visit to the park at 4:29 p.m. is a corresponding event to other park visits at about the same time (e.g., within the timestamp range). In this way, the system may account for minor discrepancies in time differences for generating corresponding events.

Additionally or alternatively, the system may determine if a current event is a high risk or low risk event. For example, the system may determine a number of corresponding events. The number of corresponding events may be an integer value, a decimal value, a floating point value, or other metric for measuring a number of events. The system may compare the number of corresponding events to a predetermined threshold number of events. The predetermined threshold number of events may be a predetermined number, integer, floating point, or other metric and may be a static value (e.g., does not change) that is preset by the system. In some embodiments, the predetermined threshold number of events may correspond to the type of corresponding event. For example, the predetermined threshold number of events for each type of corresponding event may be the same or different. As an example, a yearly routine may have only one instance throughout the year, thus the predetermined threshold number of events may be 1 or 0. As another example, a monthly routine may have at least 12 instances throughout the year, thus the predetermined threshold number of events may be 12. The system may then determine that a current event is a high risk event (e.g., high risk for a security threat) based on the number of corresponding events not satisfying the predetermined threshold number of events. Additionally or alternatively, the system may determine that a current event is a low risk event (e.g., low risk for a security threat) based on the number of corresponding events satisfying the predetermined threshold value. In this way, the more "normal" a current event is (e.g., the current event is within the typical bounds of the user's daily, weekly, monthly, yearly routines), the lower the risk of a security threat exists.

Additionally or alternatively, the system may generate a set of daily user events based on the corresponding events. For example, the set of daily user events may indicate a typical daily routine of the user. In some embodiments, these daily user events may correspond to a particular day (e.g., the user is a Saturday runner) or the daily user events may correspond to one or more days (e.g., the user eats lunch at 12:00 p.m.-1:00 p.m. each week day). The system may identify the location data, movement data, and timestamp data of each corresponding event of the set of corresponding events. Based on the identified location data, movement data, and timestamp data, the system may generate a daily user event. For example, the system may determine based on the location data, a location of where the user event takes place (e.g., GPS coordinates). The system may then associate timestamp data (e.g., the date and time) with the location. For example, once the system identifies the location data, the system may determine that the user has visited the identified location between 1:30 p.m. and 2:00 p.m. on a Friday and may associate the time/date the user visited the location with the location data. The system may then identify movement data collected while the user visited the identified location and associate such data with the location and timestamp information to generate the daily user event.

At step 510, process 500 may determine (using one or more components of system 400 (FIG. 4)) a current level of mobile device security. For instance, a mobile device may have varying types of security such as a password, pin code, token expiration time, facial recognition, gesture recognition, biometric recognition, and the alike to ensure unauthorized users are unable to access an authorized user's content. Each type of mobile device security may be associated with a security level. For instance, a password may be deemed as less secure than facial recognition—thus, a lower level of mobile device security may be associated with the password. The level of security may be a predetermined level of security that is preset by the system. In some embodiments, the level of security may be set by system administrators or the user (e.g., the user may change the settings with the security features of their mobile device and may set facial recognition to be at a lower security level than a password, etc.). The system may determine a current level of mobile device security based on the current security mechanism being employed on the mobile device. For example, the mobile device may currently be employing (e.g., using) a pin code security mechanism. The system may determine that the level of security corresponds to a level "2" protection (e.g., in the case that the level of security is on the range of 1-10, with 1 being the lowest, and 10 being the strongest.) As another example, if the mobile device is employing a facial recognition security mechanism, then the system may determine that the current level of mobile device security is at a level "8" (e.g., because facial recognition is stronger than a pin code security authentication mechanism). Although the previous example only discusses a password and facial recognition, it should be noted that other levels of security may exist for other types of mobile device security implemented on users' mobile devices and that the system may determine each current level of mobile device security based on the mechanism currently being employed.

At step 512, process 500 determines (using one or more components of system 400 (FIG. 4)) an adjustment of mobile device security. For example, the system may determine, based on the risk level and the current level of mobile device security, whether to increase the mobile device security or decrease the mobile device security. For example, when the risk level exceeds a predetermined threshold value (e.g., indicating there is a high likelihood of a security threat), the mobile device security may be increased. For instance, in the case a mobile device currently implements a pin code authentication mechanism and current motion data indicates that the mobile device is not operating within the user's typical bounds of activities, the risk level may be high (e.g., exceeding the predetermined threshold value) and the system may adjust the mobile device security to a higher level (e.g., facial recognition, user password prompt, decreased mobile device token expiration time, two-factor authentication prompt, etc.), thereby forcing a user to re-authenticate to protect the authorized users content. As another example, when the risk level does not exceed a predetermined threshold value (e.g., indicating there is a low likelihood of a security threat), the mobile device security may not be adjusted (or may be decreased to a lower level). For example, in the case a mobile device currently is implementing a token-based authentication mechanism (e.g., the token has an expiration time associated with it) and the current motion data indicates that the mobile device is operating within the user's typical bounds of activities, the risk level may be low (e.g., failing to exceed the predetermined threshold value) and the system may adjust the mobile device security to a lower level (e.g., extending the token session expiration time, a two-factor authentication prompt, a user password, etc.). In some embodiments, when the current motion data indicates the mobile device is operating within the user's typical activity bounds, the level of security may not be adjusted—thereby only requiring re-authentication when necessary.

At step 514, process 500 authenticates (e.g., using one or more components of system 400 (FIG. 4)) the user. For example, the system may authenticate the user based on a user action corresponding to the adjustment of the mobile device security. For example, the system may increase the mobile device security from a password to a facial recognition authentication mechanism. The user may need to look at the mobile device (e.g., a user action) such that the system may authenticate the user. As another example, the system may decrease the mobile device's security. For instance, if the system is currently implementing a token-based authentication mechanism, the system may increase the token expiration time, and the user may be authenticated by simply doing nothing (e.g., a user action) as re-authentication is not required at this time. Although the examples above are provided, it should be noted that other increasing/decreasing of other user device security authentication mechanisms may be used and is not limited to the examples described above.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-4 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising adjusting mobile device security, wherein the mobile device security is adjusted based on current and historical motion data obtained from a mobile device.

2. A method, the method comprising: retrieving, via a mobile device, current motion data corresponding to a user, wherein the current motion data indicates a change in position at a current location of the user relative to time; retrieving, via the mobile device, historical motion data corresponding to the user; comparing the current motion data to the historical motion data; providing the comparison to a prediction model to determine a risk level, wherein the risk level indicates a likelihood of a security threat corresponding to the user; determining a current level of mobile device security; determining, based on the risk level and the current level of mobile device security, an adjustment of mobile device security, wherein the adjustment of mobile device security is (i) increased based on the risk level exceeding a predetermined threshold value and (ii) decreased based on the risk level failing to exceed the predetermined threshold value; and authenticating the user based on a user action corresponding to the adjustment of the mobile device security.

3. A method for facilitating variable authentication of users on mobile devices based on current and historical physical movement of the mobile devices at geographic locations and during predetermined time intervals while maintaining user privacy, the method comprising: retrieving, via a mobile device, current motion data corresponding to a user, wherein the current motion data indicates a change in position at a current location of the user relative to time; retrieving, via the mobile device, historical motion data corresponding to the user; comparing the current motion data to the historical motion data; providing the comparison to a prediction model to determine a risk level, wherein the risk level indicates a likelihood of a security threat corresponding to the user; determining a current level of mobile device security; determining, based on the risk level and the current level of mobile device security, an adjustment of mobile device security, wherein the adjustment of mobile device security is (i) increased based on the risk level exceeding a predetermined threshold value and (ii) decreased based on the risk level failing to exceed the predetermined threshold value; and authenticating the user based on a user action corresponding to the adjustment of the mobile device security.

4. The method of any one of the preceding embodiments, wherein the current motion data includes current location information, wherein obtaining the current location information comprises: obtaining a first, second, third, and fourth timestamp from a first, second, third, and fourth satellite, respectively; obtaining a first, second, third, and fourth position stamp from a first, second, third, and fourth satellite, respectively; determining a fifth, sixth, seventh, and eighth timestamp from a clock on the mobile device, wherein (i) the fifth timestamp is determined when the first timestamp and first position stamp is obtained, (ii) the sixth timestamp is determined when the second timestamp and second position stamp is obtained, (iii) the seventh timestamp is determined when the third timestamp and third position stamp is obtained, and (iv) the eighth timestamp is determined when the fourth timestamp and fourth position stamp is obtained; and determining a current location of the mobile device, based on trilateration, by computing a difference between the first and fifth timestamps, second and sixth timestamps, third and seventh timestamps, fourth and eighth timestamps, respectively, wherein each difference is multiplied by the speed of light.

5. The method of any one of the preceding embodiments, wherein the current motion data includes accelerometer information, wherein obtaining the accelerometer information comprises:
receiving a voltage signal from an accelerometer on the mobile device;
comparing the voltage signal to a voltage signal threshold; and determining, based on the voltage signal comparison, motion of the mobile device.

6. The method of any one of the preceding embodiments, wherein the current motion data includes a plurality of current device sensor data, the plurality of current device sensor data comprising current (i) accelerometer sensor data, (ii) gyroscope sensor data, (iii) photo sensor data, (iv) rotational vector sensor data, or (v) geolocation sensor data and, wherein the historical motion data includes a plurality of historical device sensor data, the plurality of historical device sensor data comprising historical (i) accelerometer sensor data, (ii) gyroscope sensor data, (iii) photo sensor data, (iv) rotational vector sensor data, or (v) geolocation sensor data; and wherein, comparing the current motion data to the historical motion data further comprises: determining a set of first values, wherein the set of first values includes sensor values for each type of sensor data of the plurality of current device sensor data; determining a set of second values, wherein the set of second values includes sensor values for each type of sensor data of the plurality of historical device sensor data; determining a difference between each corresponding first value and second value; and determining, based on the difference between each corresponding first value and second value, the comparison.

7. The method of any one of the preceding embodiments, further comprising: generating, based on the current motion data, a current event, wherein the current event comprises (i) a current user location, (ii) movement data associated with the current user location, and (iii) a timestamp associated with the current user; generating, based on the historical motion data, a plurality of historical events, wherein each event of the plurality of historical events comprises (i) a location the user has previously traveled, (ii) a set of movement data associated with the location the user has previously traveled, and (iii) a timestamp associated with the location the user has previously traveled; and comparing the current event data to the plurality of historical event data to generate a set of corresponding events, wherein each corresponding event is generated based on a match between a location range, a movement data range, and a timestamp range in common with the current event data and the historical event data, and wherein each corresponding event includes location data, movement data, and timestamp data.

8. The method of any one of the preceding embodiments, further comprising: determining, based on the set of corresponding events, a number of corresponding events;
comparing the number of corresponding events to a predetermined threshold number of events;
and determining that the current event is (i) a high risk event based on the number of corresponding events not satisfying the predetermined threshold number of events and (ii) a low risk event based on the number of corresponding events satisfying the predetermined threshold number of events.

9. The method of any one of the preceding embodiments, further comprising: identifying the location data, movement data, and timestamp data of each corresponding event of the set of corresponding events; and generating a set of daily user events based on the identified location data, movement data, and timestamp data of each corresponding event of the set of corresponding events.

10. The method of any one of the preceding embodiments, further comprising: determining, based on the historical event data, a set of locations the user has previously traveled; comparing each location of the set of locations the user has previously traveled to each other; identifying, based on the comparison, a set of proximate distances, wherein the set of proximate distances are based on a first location of the set of locations being within a proximity threshold condition of a second location of the set of locations; averaging the set of proximate distances together; and determining, based on the average of proximate distances, a location range for each location of the set of locations the user has previously traveled.

11. The method of any one of the preceding embodiments, further comprising: determining, based on the historical event data, a set of locations the user has previously traveled; comparing each location of the set of locations the user has previously traveled to each other; identifying, based on the comparison, movement data values associated with each location the user has previously traveled to generate a set of movement data values; averaging the movement data values of the set of movement data values with respect to each location the user has previously traveled; and determining, based on the average of movement data values and a predetermined movement threshold value, a movement data range for each location of the set of locations the user has previously traveled.

12. The method of any one of the preceding embodiments, further comprising: determining, based on the historical event data, a set of locations the user has previously traveled; comparing each location of the set of locations the user has previously traveled to each other; identifying, based on the comparison, timestamp values associated with each location the user has previously traveled to generate a set of timestamp values associated with each location the user has previously traveled; averaging the timestamp values of the set of timestamp values with respect to each location the user has previously traveled; and determining, based on the average of timestamp values and a predetermined timestamp threshold value, a timestamp range for each location of the set of locations the user has previously traveled.

13. The method of any one of the preceding embodiments, wherein increasing the mobile device security further comprises: responsive to the risk level exceeding the predetermined threshold value: causing, based on the current level of mobile device security, at least one of (i) a user password prompt, (ii) a decreased mobile device token expiration time, or (iii) a two-factor authentication prompt.

14. The method of any one of the preceding embodiments, wherein decreasing the mobile device security further comprises: responsive to the risk level failing to exceed the predetermined threshold value: causing, based on the current level of mobile device security, at least one of (i) a user password prompt, (ii) an increased mobile device token expiration time, or (iii) a two-factor authentication prompt.

15. A tangible, non-transitory, machine-readable medium storing instructions that, when executed by a data processing apparatus, cause the data processing apparatus to perform operations comprising those of any of embodiments 1-14.

16. A system comprising: one or more processors; and memory storing instructions that, when executed by the processors, cause the processors to effectuate operations comprising those of any of embodiments 1-14.

15. A system comprising means for performing any of embodiments 1-14.

What is claimed is:

1. A mobile device for facilitating variable authentication of users based on current and historical physical movement of the mobile device at geographic locations and during predetermined time intervals while maintaining user privacy, the mobile device comprising:
memory configured to store a prediction model and historical user motion data, wherein the motion data indicates a change in position relative to time;
control circuitry configured to:
retrieve current motion data corresponding to a user, the current motion data comprising current mobile device physical sensor data including current (i) accelerometer sensor data, (ii) gyroscope sensor data, (iii) photo sensor data, (iv) rotational vector sensor data, or (iv) geolocation sensor data;
retrieve historical motion data corresponding to the user, the historical motion data comprising historical mobile device physical sensor data including historical (i) accelerometer sensor data, (ii) gyroscope sensor data, (iii) photo sensor data, (iv) rotational vector sensor data, or (iv) geolocation sensor data;
compare the current motion data to the historical motion data;
retrieve, via the memory, the prediction model;
provide the comparison to the prediction model to determine a risk level associated with the user, wherein the risk level indicates a likelihood of a security threat corresponding to the user;
determine a current level of mobile device security;
determine, based on the risk level and the current level of mobile device security, an adjustment of mobile device security, wherein the adjustment of mobile device security is (i) increased based on the risk level being greater than a predetermined threshold value and (ii) decreased based on the risk level being less than a predetermined threshold value; and
I/O circuitry configured to display a security prompt corresponding to the determined adjustment of mobile device security, wherein a user action causes authentication of the user.

2. A method for facilitating for facilitating variable authentication of users on mobile devices based on current and historical physical movement of the mobile devices at geographic locations and during predetermined time intervals while maintaining user privacy, the method comprising:

retrieving, via a mobile device, current motion data corresponding to a user, wherein the current motion data indicates a change in position at a current location of the user relative to time;
retrieving, via the mobile device, historical motion data corresponding to the user;
comparing the current motion data to the historical motion data;
providing the comparison to a prediction model to determine a risk level, wherein the risk level indicates a likelihood of a security threat corresponding to the user;
determining a current level of mobile device security;
determining, based on the risk level and the current level of mobile device security, an adjustment of mobile device security, wherein the adjustment of mobile device security is (i) increased based on the risk level exceeding a predetermined threshold value and (ii) decreased based on the risk level failing to exceed the predetermined threshold value; and
authenticating the user based on a user action corresponding to the adjustment of the mobile device security.

3. The method of claim 2, wherein the current motion data includes current location information, wherein obtaining the current location information comprises:
obtaining a first, second, third, and fourth time stamp from a first, second, third, and fourth satellite, respectively;
obtaining a first, second, third, and fourth position stamp from a first, second, third, and fourth satellite, respectively;
determining a fifth, sixth, seventh, and eighth time stamp from a clock on the mobile device, wherein (i) the fifth time stamp is determined when the first time stamp and first position stamp is obtained, (ii) the sixth time stamp is determined when the second time stamp and second position stamp is obtained, (iii) the seventh time stamp is determined when the third time stamp and third position stamp is obtained, and (iv) the eighth time stamp is determined when the fourth time stamp and fourth position stamp is obtained; and
determining a current location of the mobile device, based on trilateration, by computing a difference between the first and fifth time stamps, second and sixth time stamps, third and seventh time stamps, fourth and eighth time stamps, respectively, wherein each difference is multiplied by the speed of light.

4. The method of claim 2, wherein the current motion data includes accelerometer information, wherein obtaining the accelerometer information comprises:
receiving a voltage signal from an accelerometer on the mobile device;
comparing the voltage signal to a voltage signal threshold; and
determining, based on the voltage signal comparison, motion of the mobile device.

5. The method of claim 2, wherein the current motion data includes a plurality of current device sensor data, the plurality of current device sensor data comprising current (i) accelerometer sensor data, (ii) gyroscope sensor data, (iii) photo sensor data, (iv) rotational vector sensor data, or (v) geolocation sensor data and, wherein the historical motion data includes a plurality of historical device sensor data, the plurality of historical device sensor data comprising historical (i) accelerometer sensor data, (ii) gyroscope sensor data, (iii) photo sensor data, (iv) rotational vector sensor data, or (v) geolocation sensor data; and wherein, comparing the current motion data to the historical motion data further comprises:
determining a set of first values, wherein the set of first values includes sensor values for each type of sensor data of the plurality of current device sensor data;
determining a set of second values, wherein the set of second values includes sensor values for each type of sensor data of the plurality of historical device sensor data;
determining a difference between each corresponding first value and second value; and
determining, based on the difference between each corresponding first value and second value, the comparison.

6. The method of claim 2, further comprising:
generating, based on the current motion data, a current event, wherein the current event comprises (i) a current user location, (ii) movement data associated with the current user location, and (iii) a timestamp associated with the current user;
generating, based on the historical motion data, a plurality of historical events, wherein each event of the plurality of historical events comprises (i) a location the user has previously traveled, (ii) a set of movement data associated with the location the user has previously traveled, and (iii) a timestamp associated with the location the user has previously traveled; and
comparing the current event data to the plurality of historical event data to generate a set of corresponding events, wherein each corresponding event is generated based on a match between a location range, a movement data range, and a timestamp range in common with the current event data and the historical event data, and wherein each corresponding event includes location data, movement data, and timestamp data.

7. The method of claim 6, further comprising:
determining, based on the set of corresponding events, a number of corresponding events;
comparing the number of corresponding events to a predetermined threshold number of events; and
determining that the current event is (i) a high risk event based on the number of corresponding events not satisfying the predetermined threshold number of events and (ii) a low risk event based on the number of corresponding events satisfying the predetermined threshold number of events.

8. The method of claim 6, further comprising:
identifying the location data, movement data, and timestamp data of each corresponding event of the set of corresponding events; and
generating a set of daily user events based on the identified location data, movement data, and timestamp data of each corresponding event of the set of corresponding events.

9. The method of claim 6, further comprising:
determining, based on the historical event data, a set of locations the user has previously traveled;
comparing each location of the set of locations the user has previously traveled to each other;
identifying, based on the comparison, a set of proximate distances, wherein the set of proximate distances are based on a first location of the set of locations being within a proximity threshold condition of a second location of the set of locations;
averaging the set of proximate distances together; and determining, based on the average of proximate distances, a location range for each location of the set of locations the user has previously traveled.

10. The method of claim 6, further comprising:
determining, based on the historical event data, a set of locations the user has previously traveled;
comparing each location of the set of locations the user has previously traveled to each other;
identifying, based on the comparison, movement data values associated with each location the user has previously traveled to generate a set of movement data values;
averaging the movement data values of the set of movement data values with respect to each location the user has previously traveled; and
determining, based on the average of movement data values and a predetermined movement threshold value, a movement data range for each location of the set of locations the user has previously traveled.

11. The method of claim 6, further comprising:
determining, based on the historical event data, a set of locations the user has previously traveled;
comparing each location of the set of locations the user has previously traveled to each other;
identifying, based on the comparison, timestamp values associated with each location the user has previously traveled to generate a set of timestamp values associated with each location the user has previously traveled;
averaging the timestamp values of the set of timestamp values with respect to each location the user has previously traveled; and
determining, based on the average of timestamp values and a predetermined timestamp threshold value, a timestamp range for each location of the set of locations the user has previously traveled.

12. The method of claim 2, wherein increasing the mobile device security further comprises:
responsive to the risk level exceeding the predetermined threshold value:
causing, based on the current level of mobile device security, at least one of (i) a user password prompt, (ii) a decreased mobile device token expiration time, or (iii) a two-factor authentication prompt.

13. The method of claim 2, wherein decreasing the mobile device security further comprises:
responsive to the risk level failing to exceed the predetermined threshold value:
causing, based on the current level of mobile device security, at least one of (i) a user password prompt, (ii) an increased mobile device token expiration time, or (iii) a two-factor authentication prompt.

14. A non-transitory computer readable medium for facilitating variable authentication of users on mobile devices based on current and historical physical movement of the mobile devices at geographic locations and during predetermined time intervals while maintaining user privacy comprising instructions that, when implemented by one or more processors, cause operations comprising:
retrieving, via a mobile device, current motion data corresponding to a user, wherein the current motion data indicates a change in position at a current location of the user relative to time;
retrieving, via the mobile device, historical motion data corresponding to the user;
comparing the current motion data to the historical motion data;
providing the comparison to a prediction model to determine a risk level, wherein the risk level indicates a likelihood of a security threat corresponding to the user;
determining a current level of mobile device security;
determining, based on the risk level and the current level of mobile device security, an adjustment of mobile device security, wherein the adjustment of mobile device security is (i) increased based on the risk level exceeding a predetermined threshold value and (ii) decreased based on the risk level failing to exceed the predetermined threshold value; and
authenticating the user based on a user action corresponding to the adjustment of the mobile device security.

15. The non-transitory computer readable medium of claim 14, wherein the instructions further cause operations comprising:
obtaining a first, second, third, and fourth time stamp from a first, second, third, and fourth satellite, respectively;
obtaining a first, second, third, and fourth position stamp from a first, second, third, and fourth satellite, respectively;
determining a fifth, sixth, seventh, and eighth time stamp from a clock on the mobile device, wherein (i) the fifth time stamp is determined when the first time stamp and first position stamp is obtained, (ii) the sixth time stamp is determined when the second time stamp and second position stamp is obtained, (iii) the seventh time stamp is determined when the third time stamp and third position stamp is obtained, and (iv) the eighth time stamp is determined when the fourth time stamp and fourth position stamp is obtained; and
determining a current location of the mobile device, based on trilateration, by computing a difference between the first and fifth time stamps, second and sixth time stamps, third and seventh time stamps, fourth and eighth time stamps, respectively, wherein each difference is multiplied by the speed of light.

16. The non-transitory computer readable medium of claim 14, wherein the instructions further cause operations comprising:
receiving a voltage signal from an accelerometer on the mobile device;
comparing the voltage signal to a voltage signal threshold; and
determining, based on the voltage signal comparison, motion of the mobile device.

17. The non-transitory computer readable medium of claim 14, wherein the current motion data includes a plurality of current device sensor data, the plurality of current device sensor data comprising current (i) accelerometer sensor data, (ii) gyroscope sensor data, (iii) photo sensor data, (iv) rotational vector sensor data, or (v) geolocation sensor data and, wherein the historical motion data includes a plurality of historical device sensor data, the plurality of historical device sensor data comprising historical (i) accelerometer sensor data, (ii) gyroscope sensor data, (iii) photo sensor data, (iv) rotational vector sensor data, or (v) geolocation sensor data; and
wherein the instructions further cause operations comprising:
determining a set of first values, wherein the set of first values includes sensor values for each type of sensor data of the plurality of current device sensor data;

determining a set of second values, wherein the set of second values includes sensor values for each type of sensor data of the plurality of historical device sensor data;

determining a difference between each corresponding first value and second value; and determining, based on the difference between each corresponding first value and second value, the comparison.

18. The non-transitory computer readable medium of claim 14, wherein the instructions further cause operations comprising:

generating, based on the current motion data, a current event, wherein the current event comprises (i) a current user location, (ii) movement data associated with the current user location, and (iii) a timestamp associated with the current user location;

generating, based on the historical motion data, a plurality of historical events, wherein each event of the plurality of historical events comprises (i) a location the user has previously traveled, (ii) a set of movement data associated with the location the user has previously traveled, and (iii) a timestamp associated with the location the user has previously traveled; and comparing the current event data to the plurality of historical event data to generate a set of corresponding events, wherein each corresponding event is generated based on a match between a location range, a movement data range, and a timestamp range in common with the current event data and the historical event data, and wherein each corresponding event includes location data, movement data, and timestamp data.

19. The non-transitory computer readable medium of claim 18, wherein the instructions further cause operations comprising:

determining, based on the set of corresponding events, a number of corresponding events;

comparing the number of corresponding events to a predetermined threshold number of events; and determining that the current event is (i) a high risk event based on the number of corresponding events not satisfying the predetermined threshold number of events and (ii) a low risk event based on the number of corresponding events satisfying the predetermined threshold number of events.

20. The non-transitory computer readable medium of claim 14, wherein the instructions further cause operations comprising:

decreasing mobile device security responsive to the risk level failing to exceed the predetermined threshold value by:

causing, based on the current level of mobile device security, at least one of (i) a user password prompt, (ii) an increased mobile device token expiration time, or (iii) a two-factor authentication prompt.

* * * * *